No. 779,378. Patented January 3, 1905.

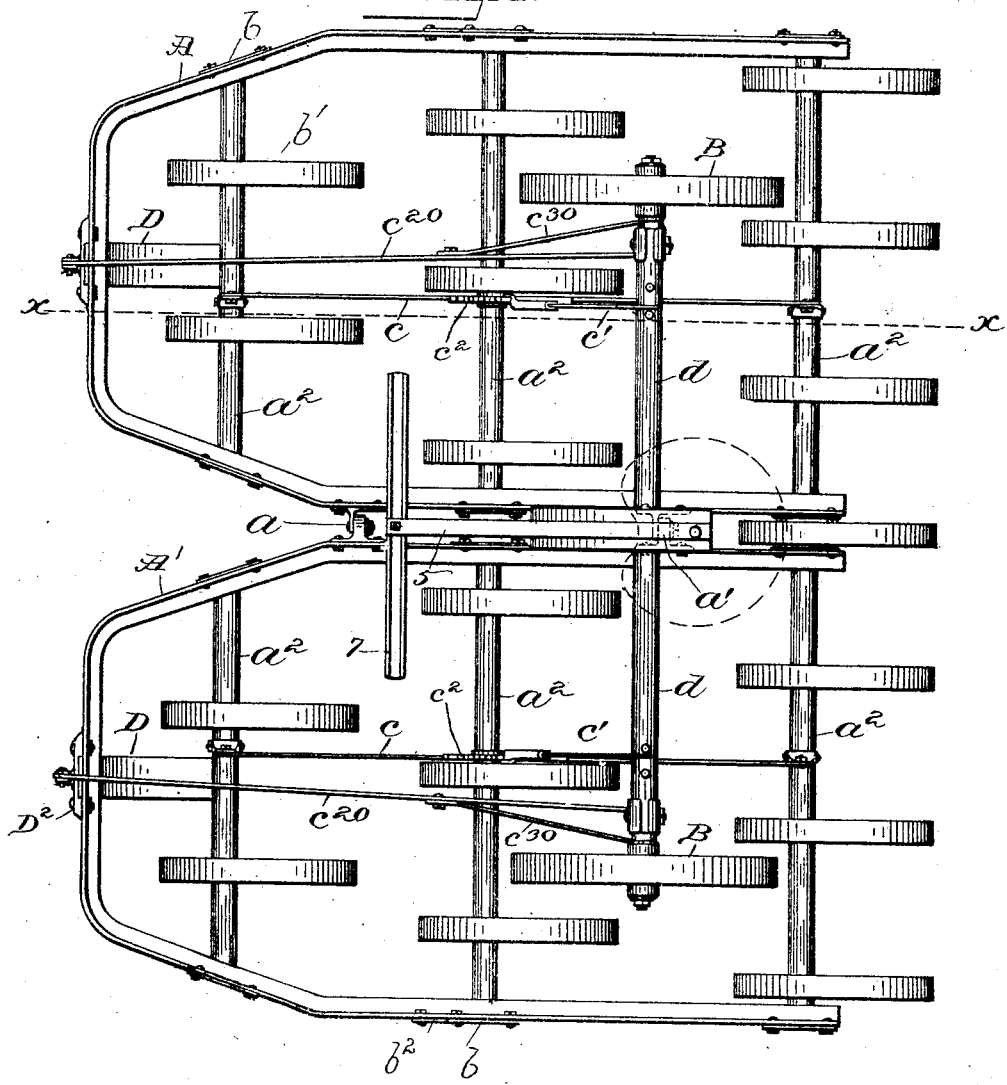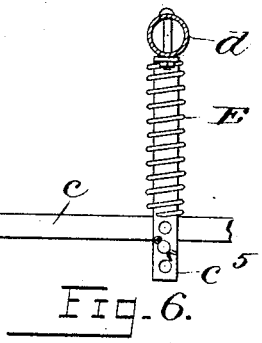

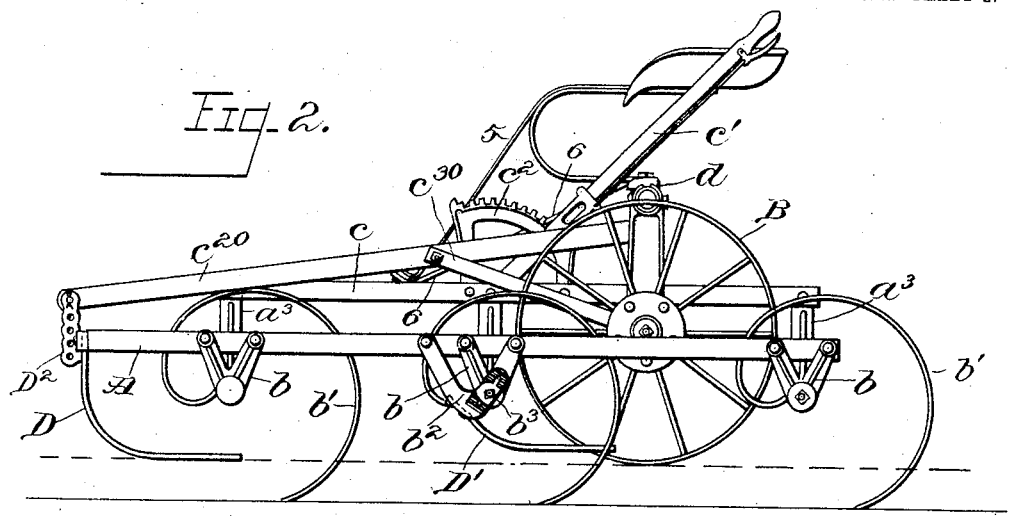
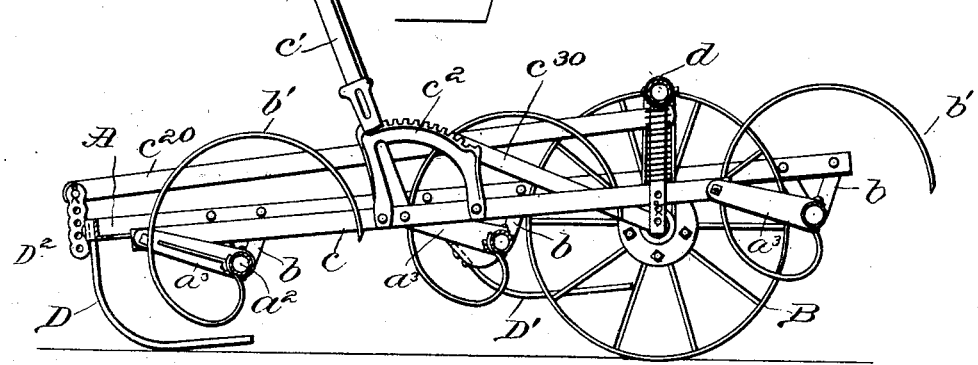
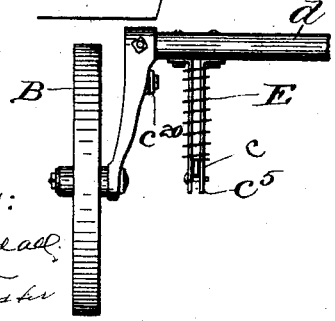

UNITED STATES PATENT OFFICE.

CHARLES S. SHARP, OF AUBURN, NEW YORK.

SULKY SPRING-TOOTH HARROW.

SPECIFICATION forming part of Letters Patent No. 779,378, dated January 3, 1905.

Application filed December 21, 1897. Serial No. 662,802.

*To all whom it may concern:*

Be it known that I, CHARLES S. SHARP, of Auburn, county of Cayuga, and State of New York, have invented an Improvement in Sulky Spring-Tooth Harrows, of which the following description, in connection with the accompanying drawings, is a specification, like characters on the drawings representing like parts.

This invention has for its object to improve the construction of sulky spring-tooth harrows; and it consists in providing a spring-tooth harrow of common form, composed, essentially, of two harrow-sections loosely connected or hinged together, with a sulky attachment connected thereto by flexible draft devices, whereby said sulky attachment will be drawn by said harrow-sections and whereby said harrow-sections will be free to move independently of each other and of the sulky attachment, and, furthermore, whereby said sulky attachment may be held relatively to said harrow-sections with its wheels parallel to the line of draft and the rear portions of said harrow-sections held down in a yielding manner to assist the teeth in penetrating stubborn soil and whereby the rear portions of said harrow-sections may be held at different elevations relatively to the supporting-frame in order that the pitch of the teeth may be changed and whereby the operator is enabled to handle the harrow to the best advantage—*i. e.*, to operate the adjusting-levers, by means of which the harrow-teeth are raised and lowered and held in different elevations, and the harrow-sections are carried at any desired height from the ground—and whereby the harrow may be at all times supported by shoes in front and wheels in the rear; yet means are provided for limiting the depth that the teeth shall penetrate the soil.

In carrying out this invention I may take an ordinary spring-tooth harrow comprising, essentially, two harrow-sections which are loosely connected or hinged together, each section comprising, for instance, a frame and a set of harrow-teeth and means for raising and lowering said teeth and for holding them at different elevations and a set of shoes or runners—as, for instance, a front shoe and a pair of rear shoes—and means to which the draft devices will be connected, and I provide such a spring-tooth harrow with a sulky attachment which is confined within the boundaries of the harrow and which consists, essentially, of an arched seat-supporting frame disposed relatively to the harrow-sections, so as to cross the junction of said harrow-sections, and bearing at its extremities a pair of wheels, and draft-bars are provided for flexibly connecting said arched seat-supporting frame with said harrow-sections. For simplicity of construction I may employ long slender draft-bars, the forward ends of which may and preferably will be pivotally connected to the forward ends of the harrow-frames and the rear ends of which will be connected to said seat-supporting frame. Guideways are provided, which depend from said seat-supporting frame, which receive coöperative parts of the harrow-sections to thereby hold the said seat-supporting frame with its wheels in parallelism with the line of draft and to also permit said harrow-sections to freely and independently rise and fall. Springs are interposed between the seat-supporting frame and the harrow-sections beneath it, which act to assist in holding down said harrow-sections.

Figure 1 shows in plan view a sulky spring-tooth harrow embodying this invention; Fig. 2, a side elevation of the same with the parts in the position they will occupy when the teeth are acting in the soil; Fig. 3, a vertical section of the same, taken on the dotted line *x x*, Fig. 1, the parts being in the position that they will occupy when the teeth are lifted and the harrow in condition for transportation; and Figs. 4, 5, and 6, details to be referred to.

In the particular form of harrow employed and to which my improvements are applied A A' represent the main frames of the two harrow-sections, being shown as substantially U-shaped frames, and they are joined together by hinges $a\ a'$. Each harrow-frame has a number of tooth-bearing cross-bars $a^2$ mounted in depending brackets $b$, which are secured to the sides of said frame, and each cross-bar has a number of spring-teeth $b'$, of any suitable kind, attached thereto in any suitable manner. Each harrow-section also has a set-lever bar $c$ connected to the cross-bars $a^2$ by arms $a^3$ and also a set-lever which is formed integral with or attached to one of said arms $a^3$—as to the middle one, for instance—and the toothed quadrant $c^2$, with which said set-lever coöperates, is attached to said bar $c$. Shoes D (see Figs. 2 and 5) are adjustably secured to the front end of each harrow-section—as, for instance, one such shoe may be applied to the draft-iron $D^2$ on each section and with it secured to the front end of the frame—and additional shoes D' are attached to each side bar of each of said frames, they being herein shown as carried by brackets $b^2$, which are attached to said frames and to the brackets $b$, and said brackets $b^2$ are made adjustable, as shown in Fig. 2, wherein it will be seen that a slot is provided through which a bolt $b^3$ passes, which connects said brackets $b^2$ with said brackets $b$.

The sulky attachment consists, essentially, of an arched supporting-frame $d$, having stub-axles at the lower extremities of its wheel-carrying arms, and wheels B are mounted on said axles. The arched supporting-frame $d$ is located above the two harrow-sections above described and is set relative thereto so as to cross the junction of said sections, and said frame is made of such length as to terminate substantially midway the width of said sections, so that the wheels B will occupy positions within the frames, as shown in Fig. 1.

The supporting-frame $d$ has depending from it at or near each end a pair of arms $c^5$, which are secured at their upper ends to said frame, and the arms of each pair are located near together to provide between them a vertical guideway. These vertical guideways are so located as to receive in them the set-lever bars $c$ of the harrow-sections and permit said bars to work longitudinally and vertically therein, and they also serve as a means of holding the sulky attachment with its wheels in parallelism with the line of draft and also permit the rear portions of said harrow-sections to freely and independently rise and fall. Springs E inclose said depending arms $c^5$, which bear upon said bars $c$ and act to yieldingly hold down the harrow-sections. At the lower ends of the arms $c^5$ several holes are formed, into any one of which a pin will be placed, upon which the bars $c$ may rest, and as said pin is changed into one or another hole said bars, and consequently the rear portions of the harrow, will occupy different elevated positions, with the result of varying the pitch of the harrow-teeth.

Bars $c^{20}$ are fixed at their rear ends to the supporting-frame (see Fig. 4) and at their front ends are loosely or pivotally attached to the front end of the harrow-frames—as, for instance, to the draft-irons, which are attached at such point—and additional bars $c^{30}$ are attached to the bars $c^{20}$ and to the supporting-frame to provide additional stiffness. The bars $c^{20}$, by which the supporting-frame is attached to the harrow-sections, are long and slender and capable of being easily bent or twisted, thereby permitting the harrow-sections to move independently of each other and of the supporting-frame. By pivotally connecting the front ends of the bars $c^{20}$ to the harrow-frames it will be seen that the rear portions of the harrow-sections are free to rise and fall independently of said frame. A seat is mounted upon a spring-support which is secured to said supporting-frame, and said seat-support is strengthened by bars 5 and 6, to the front ends of which is attached the foot-rest 7.

The rear shoes D' and the sulky-wheels B are so set relatively to each other that the tread portions of said wheels always occupy a position below the tread-surfaces of said shoes, so that the harrow will be supported upon or by the front shoes D and sulky-wheels at all times; yet the rear shoes D' are provided to limit the depth that the harrow-teeth will enter the soil if the wheels should enter a rut or other depression.

The harrow herein shown may be set with its teeth in position to penetrate the soil, as shown in Fig. 2, or said teeth may be thrown into the position shown in Fig. 3 for the purposes of transportation.

I claim—

1. A harrow comprising two harrow-sections each having means at the front end to which the draft devices are connected, a sulky attachment for said harrow comprising an arched seat-supporting frame which crosses the proximate sides of said harrow-frames, and which bears at its extremities a pair of wheels, draft-bars flexibly connecting said supporting-frame with the forward ends of said harrow-sections and vertical arms depending from said supporting-frame formed to present guideways which receive coöperative parts of said harrow-sections, permitting said harrow-sections to rise and fall independently of each other and of the supporting-frame and also hold said supporting-frame with its wheels in parallelism with the line of draft, substantially as described.

2. A harrow comprising two harrow-sections, each having a set of harrow-teeth, a front shoe and rear shoes, and means to which the draft devices will be connected, combined with a seat-supporting frame which crosses the proximate sides of said sections, a pair of wheels carried by it, the tread portions of which normally occupy a position below the tread-surfaces of said rear shoes, and means for flexibly connecting said seat-supporting frame with the harrow-sections, whereby said harrow-sections are free to move independently of each other and of said seat-supporting frame, substantially as described.

3. A harrow having a set of harrow-teeth, and front and rear shoes, and a sulky attachment comprising a seat-supporting frame and a pair of wheels, said frame being set relatively to the harrow so that the tread portions of its wheels will always occupy a position below the tread-surfaces of said rear shoes, substantially as described.

4. A harrow comprising two harrow-sections, a seat-supporting frame crossing the proximate sides of said sections and bearing a pair of wheels, bars pivotally connected at their forward ends to the harrow-sections and connected at their rear ends to said supporting-frame, arms formed to present vertical guideways which receive coöperative parts of the harrow-sections, thereby holding said supporting-frame with its wheels in parallelism with the line of draft, and permitting the harrow-sections to independently rise and fall, and springs interposed between said supporting-frame and the harrow-sections which act to yieldingly hold down said harrow-sections, substantially as described.

5. A harrow comprising two harrow-sections, each having a set of harrow-teeth and means for operating them, and each having a set of shoes, combined with a seat-supporting frame which crosses the proximate sides of said sections, a pair of wheels carried by it, means for pivotally connecting said seat-supporting frame with the forward ends of said sections, and springs interposed between said seat-supporting frame and the harrow-sections beneath it which act to yieldingly hold down said sections, substantially as described.

6. A harrow comprising two harrow-sections, each having means for operating the teeth comprising a set-lever and set-lever bar, a seat-supporting frame crossing the proximate sides of said sections and connected to the forward ends thereof and bearing a pair of wheels, and depending arms on said supporting-frame formed to present guideways which receive said set-lever bars, substantially as described.

7. A harrow comprising two harrow-sections, each having means for operating the teeth comprising a set-lever and set-lever bar, a seat-supporting frame crossing the junction of said sections and connected to the forward ends thereof and bearing a pair of wheels, and depending arms on said supporting-frame formed to present guideways which receive said set-lever bars and springs on said arms which bear upon said set-lever bars and yieldingly hold down the harrow-sections, substantially as described.

8. A harrow comprising two harrow-sections, each having means for operating the teeth comprising a set-lever and a set-lever bar, a seat-supporting frame bearing wheels and depending arms formed to present vertical guideways which receive said set-lever bars and which support the rear ends of the harrow-sections when the teeth are elevated, substantially as described.

9. A sectional harrow having tooth-adjusting bars arranged about centrally of the sections thereof, a wheeled support within the harrow and across the sections thereof with guides between which the bars play having stops to limit the downward movement of the bars.

10. A harrow having an independent wheeled riding and supporting attachment coupled loosely with the harrow and arranged within the frame of the harrow with supporting parts or portions beneath and limiting the downward movement of the harrow, whereby the weight of the harrow is carried by said attachment and the harrow is suspended from or balanced on said supporting parts.

11. A several-section lever-adjustment harrow having front depending supports, and provided with a wheeled riding attachment or support loosely coupled with the harrow and arranged transversely of the harrow-sections and intermediate of the length thereof and in advance of the rear ends of the sections, substantially as described.

12. A lever-adjustment several-section harrow having an independent wheeled riding attachment or support extending beneath intermediate portions of the adjusting-bars of the harrow-sections and arranged to uphold the sections through the medium of said bars.

13. A lever-adjustment several-section harrow having an independent wheeled riding attachment extending transversely of the sections and beneath parts thereof between the front and rear harrow-tooth bars, said attachment constructed and arranged to permit independent play of the sections and to hold the same suspended or balanced from said intermediate parts and sustain practically the full weight of the sections, substantially as described.

14. A lever-adjustment curved-spring-tooth harrow comprising several independent sections, in combination with a wheeled riding attachment limiting the downward movement of said harrow-sections and permitting independent movement of said sections above a fixed plane or planes, said attachment arranged intermediate of the length of the harrow-sections and extending transversely of the space between the two sections and of the inner frame-bars of the sections and having its wheels between the frame and tooth bars and in advance of the rear tooth-bars, substantially as described.

15. A lever-adjustment curved-spring-tooth harrow comprising several independent sections, in combination with a wheeled riding and supporting attachment limiting the downward movement of the harrow-sections to uphold the frames thereof from the ground whether the teeth are in or out of operative adjustment, said attachment comprising an axle or frame arranged transversely of the sections in advance of the rear ends thereof and across the space between the sections with supporting-wheels between the frame and tooth bars of the respective sections, and a draft appliance from said frame or axle extending forwardly to move the attachment forward with the harrow.

16. A lever-adjustment harrow comprising several independent sections, in combination with a wheeled riding and supporting attachment having an axle arranged transversely of the sections and across the inner sides thereof and in front of the rear portions of the sections and having supporting-wheels within intermediate parts of the sections, said attachment constructed and arranged to limit the downward movement of both sections and permit free upward play thereof above said limit, and provided with means coupling the attachment with the draft of the harrow and holding the axle against tilting, and depending ground-supports from the harrow-sections just in advance of the wheeled attachment, substantially as described.

17. A several-section harrow, in combination with an axle arranged above the sections and extending transversely of intermediate portions of both sections and provided with supporting-wheels between the frame and tooth bars and teeth of the respective sections and a draft-tongue from the axle extending forwardly and coupled with the draft of the harrow, said axle provided with elongated guideways loosely receiving a part of each harrow-section and each having an adjustable stop, as and for the purposes set forth.

18. A several-section lever-adjustment curved-spring-tooth harrow, each section having the central connecting-bar and the hand-lever on an intermediate tooth-bar, in combination with a wheeled supporting and riding attachment arranged transversely of an intermediate part of the harrow with its supporting-wheels between the tooth and frame bars of the respective sections, said attachment having supports beneath the respective connecting-bars of the sections limiting the downward movement thereof below certain planes and arranged beneath intermediate parts of the lengths of the bars and thereby upholding or balancing the sections from said connecting-bars, said sections having depending frame-supports in advance of the wheeled attachment to hold the front ends of the section-frames from tilting forwardly onto the ground.

19. A two-section lever-adjustment curved-spring-tooth harrow, each section having the about-central connecting-bar, and depending frame-supports in advance of its central portion, in combination with an independent wheeled riding attachment arranged transversely of the sections at or about the central or an intermediate portion thereof, said attachment coupled with the draft of the harrow and provided with vertically-elongated supports receiving the connecting-bars of the sections, respectively, near the central or intermediate portions of the lengths thereof, and limiting the downward movement of each connecting-bar and thereby upholding the sections and balancing the same independently from and by the connecting-bar of each.

20. A lever-adjustment curved-spring-tooth harrow having the connecting-bar, in combination with an independent wheeled riding attachment provided with a support at an intermediate portion of said connecting-bar and arranged with relation to and coacting with said connecting-bar to hold the same so that the harrow-frame is drawn up to permit the teeth being forced down without requiring the rider to leave his seat or lift the harrow-frame by hand, substantially as described.

21. A rocking-tooth-bar lever-adjustment curved-spring-tooth harrow, in combination with an independent wheeled riding attachment coupled to move with the harrow and permit independent play of the harrow, said attachment having a support constructed and arranged to coöperate with a part of the harrow about at the transverse central portion thereof, and lift the harrow-frame independently of the riding attachment and balance the harrow therefrom and carry practically its full weight, substantially as described.

22. A rocking-tooth-bar lever-adjustment curved-spring-tooth harrow, having the usual connecting-bar, the harrow-frame and connecting-bar approaching or receding from each other as the tooth-bars are rocked, in combination with an independent wheeled riding attachment moving with the harrow and provided with a stop or support at an intermediate part of the connecting-bar and limiting the downward movement thereof below a certain plane and thereby causing the harrow-frame to draw up toward said bar when the tooth-bars are rocked beyond certain points and hence elevating the harrow-frame and permitting the teeth to easily move down independently of the riding attachment and while the operator retains his seat, substantially as described.

23. A lever-adjustment curved-spring-tooth harrow having depending ground-supports in advance of its transverse central portion, in combination with an independent wheeled riding attachment moving forward with the harrow and arranged transversely intermediate of the harrow, and comprising supports about at the central portion of the harrow and upholding the same in an elevated plane and balancing and sustaining practically the weight thereof, said harrow allowed vertical play independent of the riding attachment and above the plane of said supports, substantially as described.

24. A harrow having an independent wheeled riding attachment arranged within the frame thereof and constructed and arranged to limit downward movement of said frame at intermediate points of the harrow and to thereby balance and uphold practically the entire harrow from the riding attachment, and means to hold the harrow-frame from rocking or tilting into engagement with the ground, substantially as described.

25. A rocking-tooth-bar lever-adjustment harrow having the connecting-bar, in combination with an independent wheeled supporting attachment moving forward with the harrow and provided with a support at a point over the harrow holding said bar against downward movement below a certain plane, whereby the frame draws up toward said bar when the tooth-bars are rocked beyond certain points, said support upholding practically the entire weight of the harrow through the medium of said bar and throwing said weight onto the wheeled attachment.

26. A harrow, in combination with an independent wheeled riding attachment moving forward therewith and provided with adjustable supports arranged about at the transverse central portion of the harrow and upholding the harrow in an elevated plane and governing the working depth of the teeth and balancing the harrow and throwing practically the entire weight of the harrow onto the attachment from intermediate points of the harrow, substantially as described.

27. A harrow having depending shoes between its transverse center and front end, in combination with a wheeled riding attachment arranged within the harrow just in rear of its transverse center line and provided with supports about at the central portion of the harrow constructed and arranged to limit the downward movement of the harrow whether the teeth are in or out of the soil and balancing and upholding the harrow from said intermediate points.

28. A lever-adjustment harrow having a connecting-bar, in combination with an independent wheeled support having an upright guide loosely receiving said connecting-bar and in which said bar moves vertically and provided with a stop limiting the downward movement of the bar and upholding the harrow through the medium of said bar.

29. A wheeled supporting attachment for harrows comprising an axle having wheels, forwardly-extending draft devices and inclosing guides to receive parts of the harrow and rigid with the axle and elongated vertically, substantially as described.

30. A curved-spring-tooth rocking-tooth-bar harrow comprising several independent sections, in combination with an independent wheeled riding attachment moving forward with the harrow and provided with a support arranged about at the transverse central portion of the harrow and constructed and arranged to balance each section and sustain practically the entire weight thereof in a certain plane with the section-frame elevated from the ground and permit independent play of each section above such plane, substantially as described.

31. A rocking-tooth-bar curved-spring-tooth harrow, in combination with an independent riding attachment moving forward with the harrow and having a support arranged transversely of the harrow about at the transverse central portion thereof and upholding the harrow in a certain elevated plane and permitting independent play thereof above said plane, and whereby the harrow is balanced from the attachment and practically the entire weight thereof is carried by the attachment, substantially as described.

32. A lever-adjustment curved-spring-tooth harrow, in combination with a wheeled supporting attachment having a seat and comprising an axle arranged transversely of and at about the transverse central portion of the harrow and having wheels between the frame and tooth bars of the harrow, said axle supporting and balancing the harrow in an elevated position whether the teeth are in or out of operative engagement with the soil and permitting independent movement of the harrow above such position, substantially as described.

33. A lever-adjustment curved-spring-tooth harrow having its adjusting-lever on an intermediate tooth-bar, in combination with an independent wheeled riding attachment moving forward with the harrow and arranged about at the transverse central portion of the harrow and provided with a rider's seat, said attachment provided with a support upholding the harrow in an elevated plane above the ground so that the harrow is balanced from the support and practically its entire weight is carried thereby, whereby the harrow-frame is held elevated when the teeth are raised so that the teeth can be lowered by said lever without lifting the frame.

34. A several-section lever-adjustment harrow having depending frame-supports in advance of its transverse center, in combination with an axle arranged transversely of the several sections and the frame-bars thereof and provided with supporting-wheels, said axle arranged transversely of the sections a distance in advance of their rear ends and having a forwardly-extending draft connection to the draft of the harrow, each section being supported or upheld from said axle in an elevated plane above the ground and movable vertically above said plane, substantially as described.

35. A harrow, in combination with an independent wheeled riding attachment coupled with the draft of the harrow and provided with vertical elongated guides embracing parts of the harrow and permitting vertical play of the harrow independently of said wheeled attachment and provided with stops limiting the play of the harrow.

36. A harrow comprising two harrow-sections each having a set of harrow-teeth and means for operating them, combined with a supporting-frame loosely connected to the harrow which crosses the proximate sides of said sections, a pair of wheels carried by it and springs interposed between said supporting-frame and the harrow-sections which act to yieldingly hold down said sections, substantially as described.

37. A harrow comprising two harrow-sections each having means for operating the teeth comprising a set-lever, a set-lever bar, a supporting-frame crossing the junction of said connections and connected to the forward ends thereof and bearing a pair of wheels, guideways on said supporting-frame, elongated vertically which receive said set-lever bars, substantially as described.

38. A harrow comprising two harrow-sections each having means for operating the teeth comprising a set-lever, a set-lever bar, a supporting-frame crossing the junction of said sections and connected to the forward ends thereof and bearing a pair of wheels, guideways on said supporting-frame elongated vertically which receive said set-lever bars, and springs held in vertical position by said guideways which bear upon said set-lever bars for yieldingly holding the harrow down to its work, substantially as described.

39. A wheeled supporting attachment for harrows having vertical guides to hold the harrow against lateral swaying and permit vertical movement thereof, and springs interposed between said supporting attachment and the harrow for yieldingly holding said harrow down to work, substantially as described.

40. A wheeled supporting attachment for harrows having vertical guides to hold the harrow against lateral swaying and permit vertical movement thereof, and springs on the supporting attachment supported by said vertical guides which are interposed between said supporting attachment and the harrow for yieldingly holding said harrow down to its work, substantially as described.

41. A lever-harrow provided with frame-supports, in combination with an independent wheeled attachment, the wheels arranged to run within the harrow-frame, and supporting connections between the wheeled attachment and the harrow-frame, whereby the harrow-frame is supported in a given horizontal plane above the ground and is free to move above the plane of the supports.

42. A lever-harrow composed of sections provided with depending frame-supports, in combination with a wheeled attachment, the wheels arranged to run within the sections of the harrow-frame, and supporting connections between the wheeled attachment and each section of the harrow-frame, whereby the sections of the harrow-frame are supported in a plane above the ground and the harrow is free to move above the plane of the supports.

43. A lever curved-spring-tooth harrow with depending frame-supports, in combination with a wheeled attachment, the wheels arranged to run within the harrow-frame and the supporting connections between the wheeled attachment and the harrow-frame, whereby the harrow-frame is supported in a plane above the ground and is free to move above the plane of the supports.

44. A sectional lever, curved-spring-tooth harrow, each section having a depending frame-support, in combination with a wheeled attachment, the wheels arranged to run within the harrow-frame, and supporting connections between the wheeled attachment and each section of the harrow-frame, whereby the sections of the harrow-frame are supported in a plane above the ground and are free to move above the plane of the supports.

45. A lever-harrow provided with depending frame-supports, in combination with a wheeled attachment, the wheels arranged to run within the harrow-frame, draft devices rigidly secured to the axle, and a flexible connection at the point at which they are connected to the harrow-draft, the draft devices between the points of connection being rigid, and supporting connections between the wheeled attachment and the harrow-frame, whereby the harrow-frame is supported independently in an elevated plane above the ground, and is free to move above the plane of the support.

46. A lever curved-spring-tooth harrow, in combination with an independent wheeled attachment, the wheels arranged to run within the harrow-frame, supporting connections between the wheeled attachment and the harrow-frame, whereby the harrow-frame is supported in an elevated plane, and is free to move above the plane of the support.

47. A sectional-lever curved-spring-tooth harrow, in combination with an independent wheeled attachment, the wheels of the attachment arranged to run within the frame of the sections of the harrow, and supporting connections between the independent wheeled attachment and the sections of the harrow-frame, whereby the sections of the harrow-frame are supported in a plane above the ground and are free to move above the plane of the support.

48. A lever curved-spring-tooth harrow, in combination with a wheeled attachment, the wheels arranged to run within the harrow-frame, rigid draft devices connecting the wheeled attachment to the draft of the harrow, and supporting connections between the wheeled attachment and the harrow-frame, whereby the harrow-frame is supported loosely in a plane above the ground, and is free to move above the plane of the support, for the purposes stated.

49. A sectional-lever spring-tooth harrow, in combination with a wheeled attachment, the wheels arranged to run within the sections of the harrow, rigid draft devices made adjustable with the draft of the harrow, and supporting connections between the wheeled attachment and the several sections of the harrow-frame, whereby the sections of the harrow-frame are supported loosely in a plane above the ground, and are free to move above the plane of the support.

50. A lever-harrow in combination with a wheeled attachment, the wheels arranged to run within the contour of the harrow-frame, draft devices secured rigidly to the axle between the wheels and flexibly connected at the front to the draft of the harrow, and supporting connections between the wheeled attachment and the frame, whereby the harrow-frame is supported loosely in a plane above the ground, and is free to move above the plane of the supports.

51. A lever-harrow, having tooth-bars running substantially at right angles to the line of draft, in combination with a wheeled attachment, the wheels arranged to run within the harrow-frame, draft devices rigidly connected between the wheels and flexibly connected with the draft of the harrow, supporting connections between the harrow-frame and the wheeled attachment, and means for balancing the harrow-frame, whereby the frame can be supported loosely in a plane above the ground, and leave the harrow-frame free to move above the plane of the supports.

52. A lever-harrow provided with depending frame-supports in combination with a wheeled attachment, the wheels arranged to run within the harrow-frame, rigid draft devices connecting the wheeled attachment with the draft of the harrow, and mechanism substantially as set forth for adjusting the coöperation of the parts of the harrow and wheeled attachment, whereby the harrow-frame is carried in a plane above the ground, and is left free to move above the plane of the support.

53. A lever-harrow, having dependent frame-supports for carrying the frame in a plane above the ground, in combination with a wheeled attachment, the wheels running within the frame-bars of the harrow, the harrow and wheeled attachment connected to be drawn together, and means substantially as set forth for carrying the harrow-frame in an elevated plane above the ground and leaving the harrow free to move above the plane of the support, substantially as set forth.

54. A harrow having depending frame-supports for carrying the frame in a plane above the ground, in combination with a wheeled attachment, the wheels arranged to run within the frame of the harrow, the wheeled attachment and harrow adjustably connected to the draft, and connecting means between the axle of the wheeled attachment and the frame of the harrow, whereby the harrow-frame can be carried in an elevated plane above the ground, and left free to move above the plane of the support, for the purposes stated.

55. A lever-harrow and an independent wheeled attachment, the wheels located within the frame of the harrow, in combination with mechanism substantially as set forth, for connecting and drawing the harrows and wheeled attachment together, and whereby the harrow is free to move above the plane of its support, when the teeth are in or out of engagement with the soil, for the purposes stated.

56. A harrow, in combination with a wheeled supporting attachment coupled thereto and provided with depending U-shaped hangers loosely receiving an adjusting-bar of the harrow, substantially as described.

57. A harrow, in combination with a wheeled supporting attachment coupled therewith and provided with rigid depending inclosing guides forming supports beneath parts of the harrow-frame held against vertical movement independently of said frame, said supports upholding the rear portion of the harrow-frame in a certain predetermined plane, substantially as described.

In testimony whereof I have signed my name to this specification in the presence of two subscribing witnesses.

CHARLES S. SHARP.

Witnesses:
 RAYMOND M. ATHERLY,
 FRED M. EVERETT.